M. L. ALDRICH.
SPRING WHEEL.
APPLICATION FILED NOV. 10, 1921.

1,438,207.

Patented Dec. 12, 1922.

WITNESSES:

INVENTOR
Myron L. Aldrich.

Attorney

Patented Dec. 12, 1922.

1,438,207

UNITED STATES PATENT OFFICE.

MYRON L. ALDRICH, OF MADISON, WISCONSIN.

SPRING WHEEL.

Application filed November 10, 1921. Serial No. 514,429.

*To all whom it may concern:*

Be it known that I, MYRON L. ALDRICH, a citizen of the United States, residing at Madison, in the county of Dane and State of Wisconsin, have invented certain new and useful Improvements in Spring Wheels, of which the following is a specification.

This invention relates to spring wheels and has for its object to provide an improved wheel of that type, characterized by the use of spring spokes, with improved means for increasing or decreasing the tension of the springs between the hub and the rim.

The wheel embodies a hub, a tread rim, a pair of rings located at opposite sides of the rim and flexibly connected thereto, and spring spokes connecting the hub and said rings, the spokes being crossed or staggered so as to give a radial yielding action as well as a lateral yielding action which latter will prevent buckling or collapse of the wheel under side strain.

Figure 1:
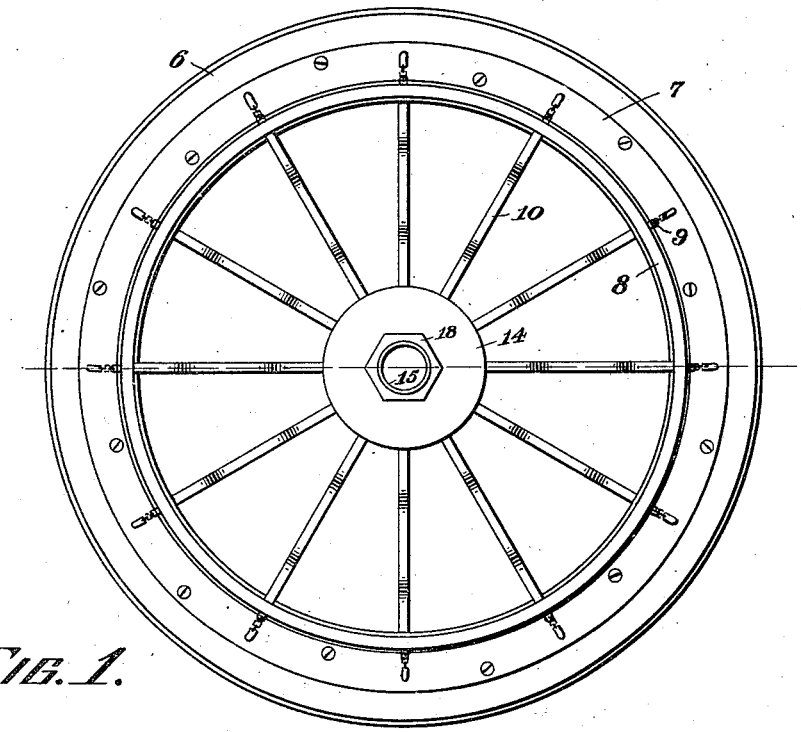
Figure 2:
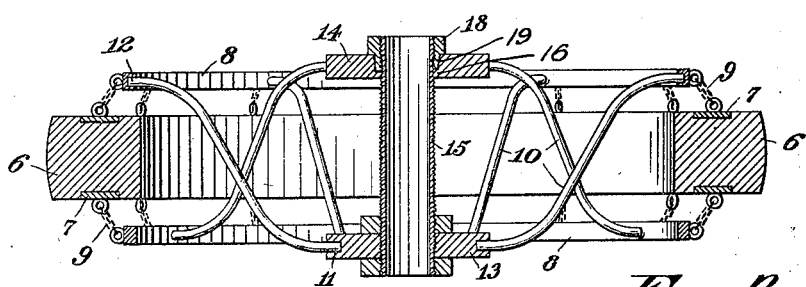
Figure 3:
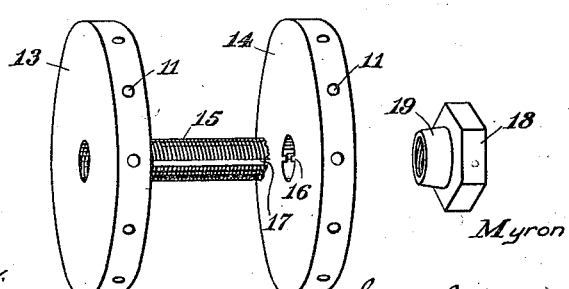

The invention is illustrated in the accompanying drawings in which Fig. 1 is a side elevation of the wheel. Fig. 2 is a cross section. Fig. 3 is a perspective view of the hub.

Referring specifically to the drawings, 6 indicates the tread rim, comprising a ring made of wood fiber or other material, of sufficient strength to stand the strain or shock. This is strengthened by metal ring plates 7 fastened on opposite sides of the rim.

At each side of the tread rim, and spaced slightly therefrom, is a metal ring 8, of less diameter than the tread rim. These rings are connected to the tread rim by a series of chains or cables 9, fastened at their opposite ends to the plates 7 and rings 8 respectively. The rim is thereby held or supported between the rings and in somewhat flexible relation thereto, although the chains 9, when joined, will not permit any great amount of relative movement.

The spokes 10 consist preferably of round steel rods or wires, which are somewhat elastic, but of sufficient strength to support the load. Each spoke is set at its inner end in a socket 11 in one of the hub parts, and at its outer end is screwed in or otherwise rigidly fastened in a socket 12 in one of the rings 8.

The hub comprises two opposite disks or heads 13 and 14 connected by a sleeve 15 which is threaded on the outside. This sleeve or skein is fastened at one end to the head 13, and the head 14 is slidable thereon, rotation being prevented by keys 16 projecting from the head at the eye thereof, into longitudinal grooves or key ways 17 in the sleeve 15. The movable head 14 may be adjusted toward or from the head 13 by means of a nut 18 which screws on the end of the sleeve 15, said nut preferably having a short sleeve 19 which enters a socket on the outer side of the head 14 to center said head and prevent mashing the threads.

The spokes 10 are bent to cross from one side of the wheel to the other. That is, the spokes which are fastened to the head 13 at one side of the wheel extend across between the hub and the tread rim and are fastened at their outer ends to the ring 8 on the opposite side of the wheel, and the spokes 10 which are fastened to the head 14 are crossed to the ring 8 on the other side of the wheel, the spokes on the respective sides being alternately arranged, with respect to each other.

The tension of the spokes may be adjusted by the movable head 14. When said head is forced inwardly toward the head 13 the spokes are straightened, so to speak, or are placed under greater tension with respect to the rings 8, and when the head 14 is adjusted outwardly the tension is relieved to a corresponding extent. This permits a greater or lesser amount of movement of the rings 8 with respect to the hub, and under weight or shock the spring spokes 10 will bend to a greater or lesser extent, to absorb the vibrations. Under side or dishing strain the spring spokes 10 will also give or yield to a certain extent whereby the wheel is cushioned both radially and laterally.

In use the sleeve 15 fits over the spindle of the axle, the same as any hub.

The invention is not limited to the particular form shown, but may be varied in numerous respects, within the scope thereof.

I claim:

1. In a spring wheel, the combination of a tread rim, a pair of rings spaced from opposite sides thereof, flexible connections between the rings and the rim, a hub, and curved spring spokes between the rings and the hub, said spokes crossed transversely of the wheel and alternately connected respectively to the opposite rings and the opposite ends of the hub.

2. A spring wheel comprising an outer rim, rings spaced therefrom and located at the opposite outer sides thereof, flexible connections between the rim and said rings, said connections being attached to the rim on the outer side thereof, a hub, and crossed spokes between the hub and the rings.

In testimony whereof, I affix my signature, in presence of two witnesses.

MYRON L. ALDRICH.

Witnesses:
A. J. BUENZLI,
LAURA J. LEE.